(12) United States Patent  
Edelin et al.

(10) Patent No.: US 10,207,755 B2
(45) Date of Patent: Feb. 19, 2019

(54) RECOIL ASSEMBLY FOR UNDERCARRIAGE SYSTEM

(71) Applicant: Caterpillar Inc., Peoria, IL (US)

(72) Inventors: John Bradley Edelin, Raleigh, NC (US); Dewakar Venkata Jonnakuti, Raleigh, NC (US); Ronald Jerome Maier, Raleigh, NC (US)

(73) Assignee: Caterpillar Inc., Deerfield, IL (US)

( * ) Notice: Subject to any disclaimer, the term of this patent is extended or adjusted under 35 U.S.C. 154(b) by 345 days.

(21) Appl. No.: 15/219,324

(22) Filed: Jul. 26, 2016

(65) Prior Publication Data

US 2018/0029654 A1 Feb. 1, 2018

(51) Int. Cl.
*B62D 55/30* (2006.01)
*B62D 55/088* (2006.01)
*E02F 3/76* (2006.01)

(52) U.S. Cl.
CPC ......... *B62D 55/305* (2013.01); *B62D 55/088* (2013.01); *E02F 3/7609* (2013.01)

(58) Field of Classification Search
CPC .............................. B62D 55/30; B62D 55/305
See application file for complete search history.

(56) References Cited

U.S. PATENT DOCUMENTS

| | | | |
|---|---|---|---|
| 3,647,270 A * | 3/1972 | Althaus | B62D 55/30 305/146 |
| 5,794,731 A | 8/1998 | Klaus | |
| 8,011,740 B2 | 9/2011 | Matthys | |
| 8,348,356 B2 | 1/2013 | Ehuraj | |
| 8,528,671 B2 | 9/2013 | Beasley et al. | |
| 8,708,431 B2 * | 4/2014 | Vigren | B62D 55/30 305/143 |
| 9,988,111 B2 * | 6/2018 | Maier | B62D 55/305 |
| 2006/0108870 A1 * | 5/2006 | Livesay | B62D 55/305 305/148 |
| 2009/0001809 A1 * | 1/2009 | Johnson | B62D 55/12 305/143 |
| 2014/0144716 A1 * | 5/2014 | Wirkus | B62D 55/305 305/145 |

* cited by examiner

*Primary Examiner* — Jason R Bellinger

(57) ABSTRACT

A bulkhead assembly for a track adjust cylinder of an undercarriage system is provided. The bulkhead assembly includes a bulkhead having an opening to receive the track adjust cylinder. A guide element having a hollow cylindrical configuration is attached to the bulkhead and supports the track adjust cylinder. A seal member is axially aligned with respect to the guide element. The seal member has a diameter smaller than a diameter of the guide element. A set of composite bearings is axially aligned with respect to the seal member.

17 Claims, 5 Drawing Sheets

RECOIL ASSEMBLY FOR UNDERCARRIAGE SYSTEM

TECHNICAL FIELD

The present disclosure relates to an undercarriage system for machines. More specifically, the present disclosure relates to a recoil assembly for the undercarriage system.

BACKGROUND

A tracked work machine, such as a track-type tractor or an excavator, is typically supported and propelled by a pair of undercarriage assemblies. Each of the pair of undercarriage assemblies includes an endless track chain having a number of interconnected articulating components or links. Each undercarriage assembly typically also includes a drive wheel or sprocket and one or more idler wheels. During operation, the track chain advances around the drive wheel and the one or more idler wheels.

Generally, it is desirable to have the track chain relatively taut while digging or performing any other type of work operation in order to prevent a machine from rolling back and forth within the interior of the track chain. This may take place due to recoil forces generated during performance of the work operation. To create tension on the track chain, the hydraulic cylinder or the coiled spring of the tension adjustment mechanism urges the idler wheel away from the drive wheel, increasing the dimension of the undercarriage assembly which the track chain must encircle.

In contrast, it is also desirable to have the track chain relatively loose during advancement or travel of a track-type tractor. In order to reduce tension in the track chain, the hydraulic cylinder or coiled spring of the tension adjustment mechanism allows the idler wheel to move toward the drive wheel.

The tension adjustment mechanism also provides a recoil functionality in the track chain, accommodating temporary forces on the track such as when an obstacle, for example a rock, is ingested between the track and the wheels during advancement of the track-type tractor. In these instances, the idler wheel may recoil towards the drive wheel in order to accommodate the extra length the track must encircle to accommodate the rock without breaking.

Current designs make use of bearing blocks to support the hydraulic cylinder. The bearing blocks may include wear strips along which the hydraulic cylinder may slide. The wear strips may require frequent maintenance and/or replacement, leading to increased machine downtime and associated costs.

U.S. Pat. No. 8,011,740 (hereinafter referred to as '740 reference) describes a track type tractor including a modular track roller frame made up of easily assembled sub-components. Among these sub-components are an idler recoil assembly that may slide into, and then fastens to a housing as a unit to create a track roller frame assembly. The idler recoil assembly includes a gas spring telescoping section and a length adjustment telescoping section located between a housing contact end and a yoke contact end. However, the '740 reference does not describe a maintenance free design of the idler recoil assembly.

Hence, there is a need for an improved recoil mechanism associated with the undercarriage assembly.

SUMMARY

Figure 1:
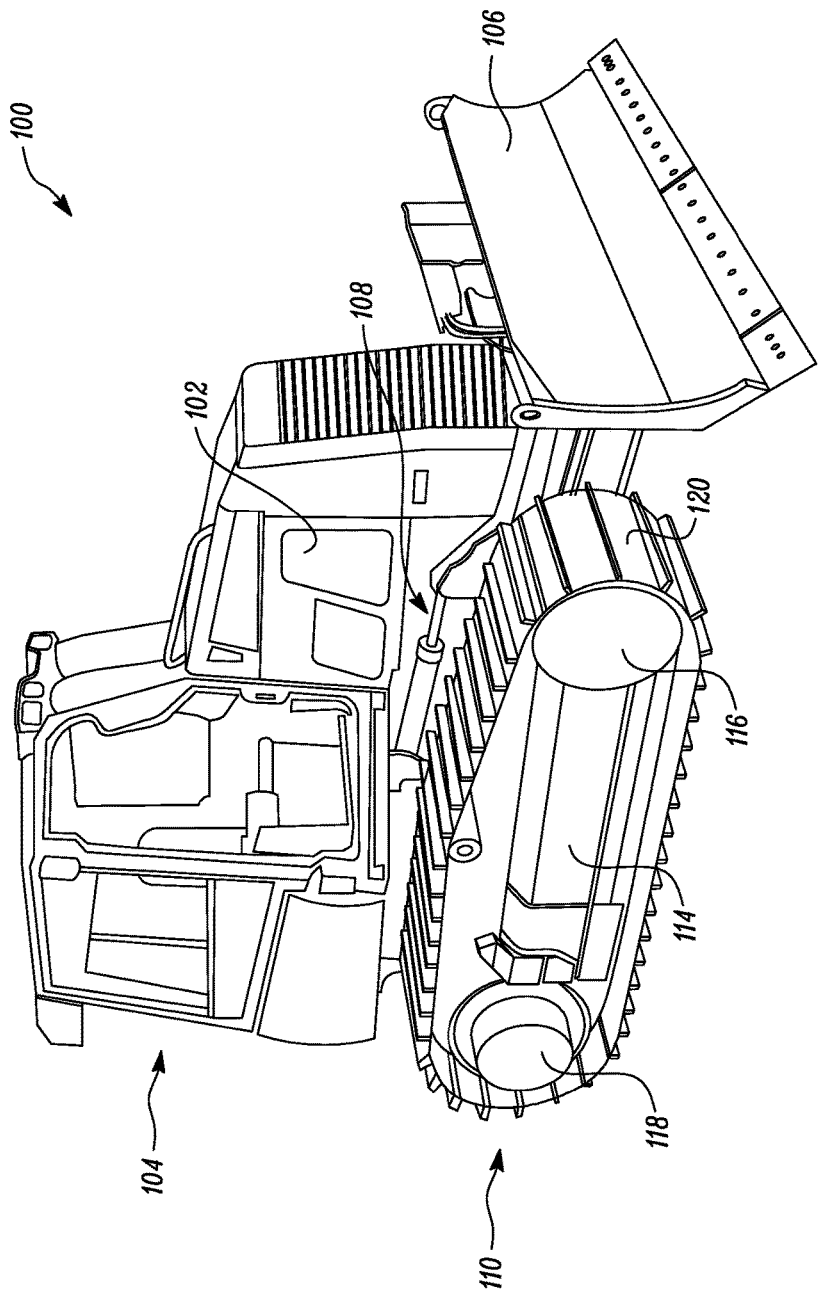
FIG. 1 is a perspective view of an exemplary machine, in accordance with an embodiment of the present disclosure.

In an aspect of the present disclosure, a bulkhead assembly for a track adjust cylinder of an undercarriage system is provided. The bulkhead assembly includes a bulkhead having an opening for receiving the track adjust cylinder. The bulkhead assembly includes a guide element having a hollow cylindrical configuration and is attached to the bulkhead to support the track adjust cylinder. The bulkhead assembly includes a seal member having a diameter smaller than a diameter of the guide element axially aligned with respect to the guide element. The bulkhead assembly further includes a set of composite bearings axially aligned with respect to the seal member.

In another aspect of the present disclosure, a recoil assembly for an undercarriage system including an idler is provided. The recoil assembly includes a swing link having a first end and a second end. The first end of the swing link is coupled to the idler. The recoil assembly includes a yoke having a first end and a second end. The first end of the yoke is coupled to the second end of the swing link. The recoil assembly includes a track adjust cylinder having a head end and a rod end. The head end is coupled to the second end of the yoke. The recoil assembly includes a bulkhead having an opening for receiving the track adjust cylinder. The recoil assembly includes a guide assembly supporting the track adjust cylinder. The guide assembly includes a guide element having a hollow cylindrical configuration and is attached to the bulkhead. The guide assembly includes a seal member axially aligned with respect to the guide element. The seal member has a diameter smaller than a diameter of the guide element. The guide assembly further includes a set of composite bearings axially aligned with respect to the seal member. The recoil assembly further includes a recoil spring attached to the rod end of the track adjust cylinder.

In yet another aspect of the present disclosure, a machine includes an undercarriage system. The undercarriage system includes a track and a recoil assembly for the undercarriage system. The recoil assembly includes a swing link having a first end and a second end. The first end of the swing link is coupled to an idler of the undercarriage system. The recoil assembly includes a yoke having a first end and a second end. The first end of the yoke is coupled to the second end of the swing link. The recoil assembly includes a track adjust cylinder having a head end and a rod end. The head end of the track adjust cylinder is coupled to the second end of the yoke. The recoil assembly includes a bulkhead having an opening for receiving the track adjust cylinder. The recoil assembly includes a guide assembly for supporting the track adjust cylinder. The guide assembly includes a guide element having a hollow cylindrical configuration and is attached to the bulkhead. The guide assembly includes a seal member axially aligned with respect to the guide element. The seal member has a diameter smaller than a diameter of the guide element. The guide assembly further includes a set of composite bearings axially aligned with respect to the seal member. The recoil assembly further includes a recoil spring attached to the rod end of the track adjust cylinder.

Detailed Description

Wherever possible, the same reference numbers will be used throughout the drawings to refer to same or like parts. FIG. 1 illustrates an exemplary machine 100. The machine 100 is a track type tractor. Alternatively, the machine 100 may be any other tracked mobile machine such as, a track loader, an excavator, a dozer, and so on that performs operations associated with industries such as mining, construction, farming, transportation, landscaping, or the like. While the following detailed description describes an exemplary aspect in connection with the track-type tractor, it should be appreciated that the description applies equally to the use of the present disclosure in other tracked machines.

The machine 100 includes a power source 102 and an operator's station 104. The operator's station 104 may include a user interface (not shown) necessary to operate the machine 100. The machine 100 further includes a machine implement 106 embodied as a blade. Alternatively, the machine implement 106 may include any other work tool such as, a shovel, a ripper, a bucket, and so on for performing the desired task at a worksite. The power source 102 may be an engine that provides power to support, steer, and propel the machine 100. In one embodiment, the power source 102 may provide power to actuate a hydraulic mechanism 108 to move or position the machine implement 106. The power source 102 may embody an engine such as, for example, a diesel engine, a gasoline engine, a gaseous fuel-powered engine, or any other type of combustion engine known in the art.

The machine 100 further includes an undercarriage system 110. The undercarriage system 110 includes a track system positioned on each of two opposing side frames of the machine 100. The undercarriage system 110 further includes a track roller frame 114 coupled with the side frame and a number of rotatable track-engaging elements, such as an idler 116 and a sprocket 118. The idler 116 is configured to rotate passively during operation of the undercarriage system 110. The sprocket 118 is configured to drive the undercarriage system 110.

The undercarriage system 110 includes a number of track rollers (not shown) mounted to the track roller frame 116 to bear a weight of the machine 100. The undercarriage system 110 further includes a track 120 extending about each of the rotatable track-engaging elements, that is, the idler 116 and the sprocket 118. The embodiment shown in FIG. 1 will be recognized by those skilled in the art as a low drive or an oval track system, however, it should be appreciated that the present disclosure could be applied to high drive tracks or some other track configuration. Also, the design of the track system shown in the accompanying figures is exemplary and may vary based on the application.

Figure 2:
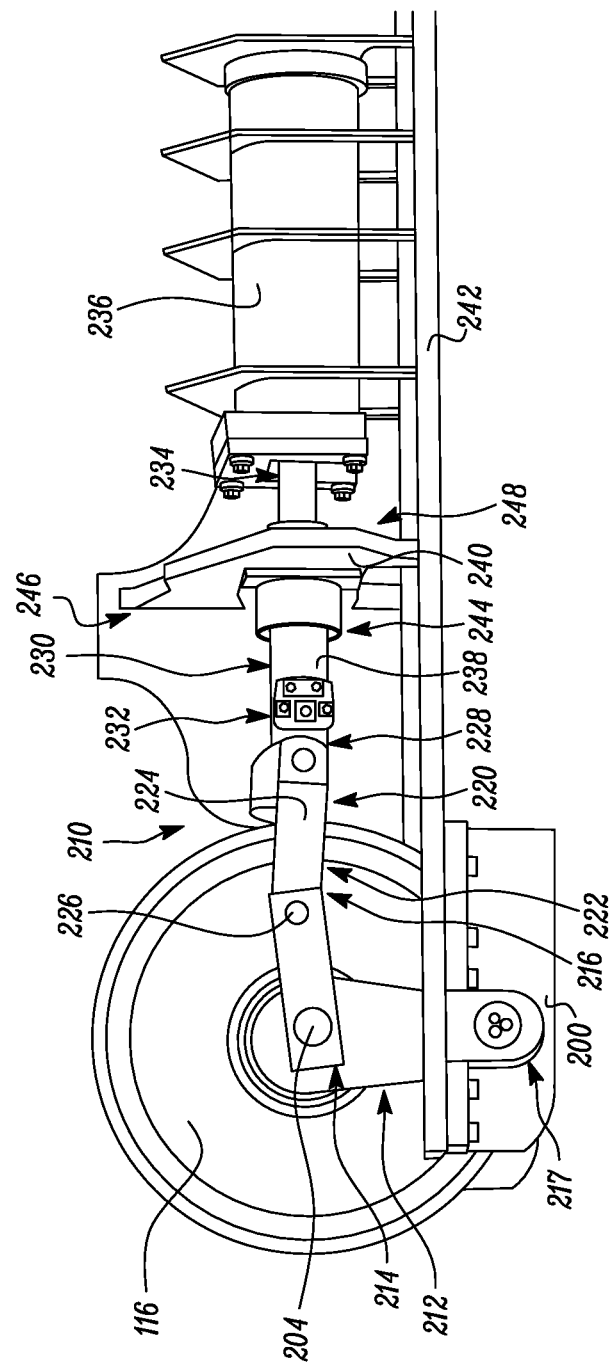
FIG. 2 is a side view of the undercarriage assembly of the machine of FIG. 1.

Referring to FIG. 2, the idler has a central opening to receive a mechanical fastener or a pin 204. The undercarriage system 110 includes a recoil assembly 210 for absorbing various shocks and other forces which may act on the undercarriage system 110. The recoil assembly 210 includes a swing link 212 having a first end 214 and a second end 216.

The first end 214 of the swing link 212 is coupled to the idler 116 such that the swing link 212 can rotate about the first end 214. The swing link 212 is connected to the idler 116 at the opening in the idler 116 through the mechanical fastener 204. The first end 214 of the swing link 212 has a hole to allow the mechanical fastener or the pin 204 to pass through for coupling the swing link 212 to the idler 116. The swing link further has a third end 217. The idler 116 is further connected to a guard 200 at the third end 217 of the swing link 212 in a similar manner as the first end 214 of the swing link 212 is connected to the idler 116. A similar second swing link (not shown) is provided on an opposite side of the idler 116. The second swing link is coupled to the idler 116 in a similar manner. The second end 216 of the swing link 212 is coupled to a yoke 220. The yoke 220 has a first end 222 having a first arm 224 and a second arm (not shown) extending on either side of the idler 116. The first arm 224 is coupled with the second end 216 of the swing link 212 through a pivot joint 226. The second arm may be similarly coupled with the second swing link. Any other type of joint may also be used to couple the first arm 224 and the second arm of the yoke 220 with the swing link 212 and the second swing link. The yoke 220 may rotate about the first end 222 based on the corresponding relative motion of the swing link 212.

A second end 228 of the yoke 220 is coupled to a track adjust cylinder 230. The track adjust cylinder 230 has a head end 232 and a rod end 234. As illustrated, the head end 232 of the track adjust cylinder 230 is coupled to the second end 228 of the yoke 220. The head end 232 of the track adjust cylinder 230 includes an eye. Mechanical fasteners may be used to couple the second end 228 of the yoke 220 with the eye of the head end 232 of the track adjust cylinder 230. The rod end 234 of the track adjust cylinder 230 is connected to a recoil spring 236. Various other parts may be connected in between to facilitate coupling of the rod end 234 of the track adjust cylinder 230 and the recoil spring 236. It should be contemplated that either of the head end 232 of the track adjust cylinder 230 or the rod end 234 of the track adjust cylinder 230 may be coupled to the second end 228 of the yoke 220 without departing from the scope of the present disclosure.

The track adjust cylinder 230 may be actuated by hydraulic or pneumatic means. An outer surface 238 of the track adjust cylinder 230 is machined so as to make the outer surface 238 smooth and reduce friction. The outer surface 238 of the track adjust cylinder 230 may also be partially machined. In an embodiment, the outer surface 238 of the track adjust cylinder 230 is machined only up till a length equal to that of travel of the track adjust cylinder 230. The recoil assembly 210 further includes a bulkhead 240 having an opening to receive the track adjust cylinder 230. The opening has a circular cross section. In other embodiments, the opening may have any other cross sectional shape based on the need of the application. The bulkhead 240 is supported by a set of rails 242 extending across the undercarriage system 110 supporting various other parts and subsystems not described herein. The bulkhead 240 may also be supported by any other such mechanism in accordance with the scope of the present disclosure.

Figure 3:
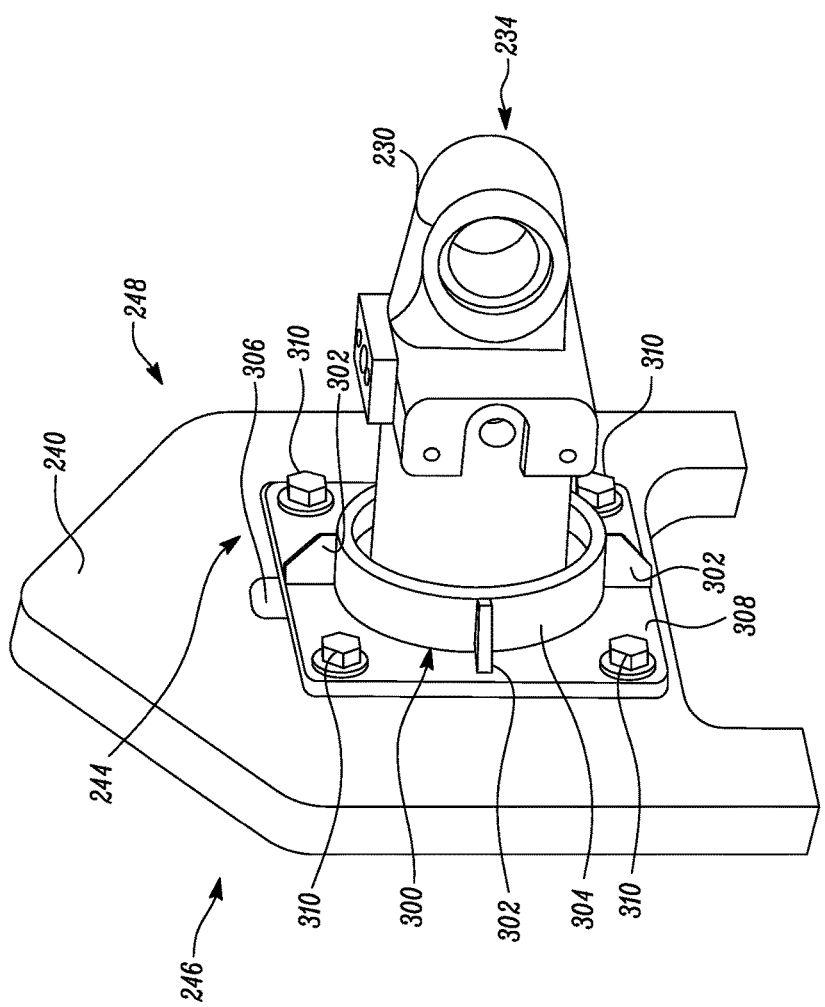
FIG. 3 is a perspective view of a bulkhead assembly of the undercarriage assembly.
Figure 4:
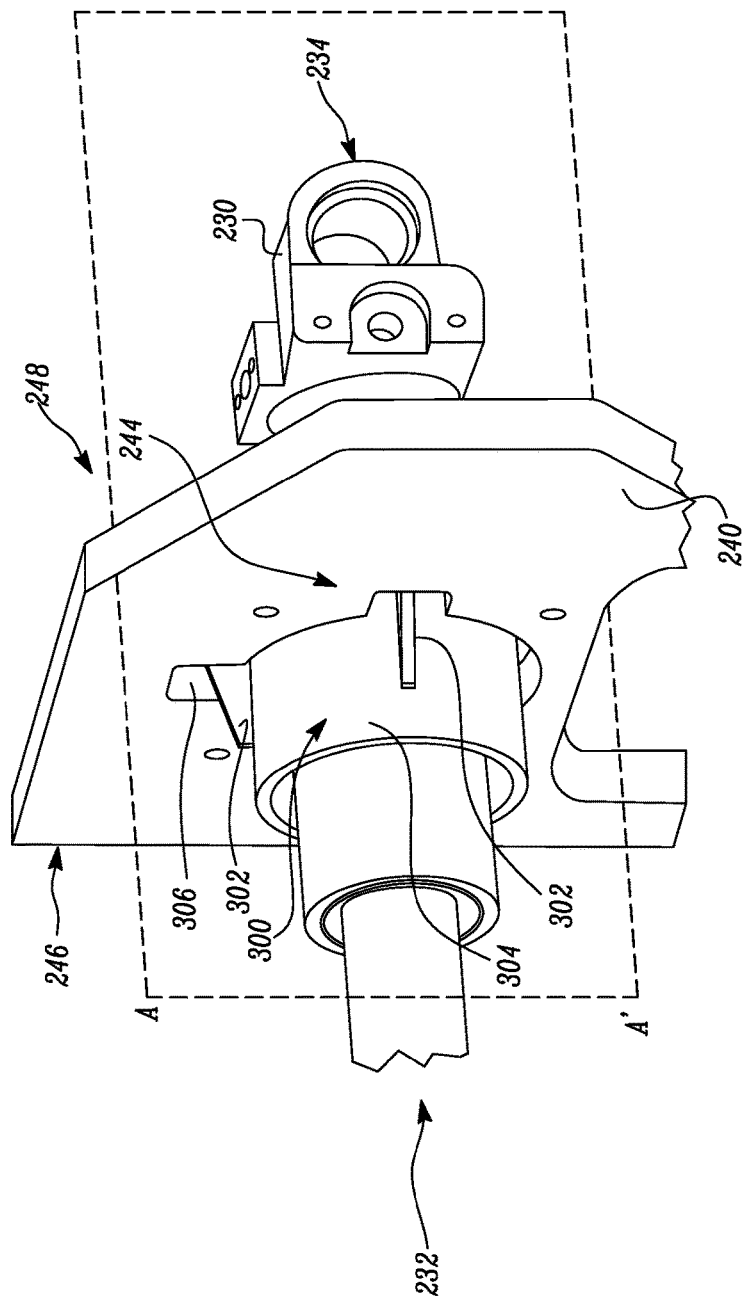
FIG. 4 is another perspective view of the bulkhead assembly of the undercarriage assembly.

A guide assembly 244 is attached to the bulkhead 240 to support the track adjust cylinder 230. The guide assembly 244 has a first end 246 proximate to the head end 232 of the track adjust cylinder 230 and a second end 248 proximate to the rod end 234 of the track adjust cylinder 230. Referring to FIGS. 3 and 4, the guide assembly 244 includes a guide element 300 attached to the bulkhead 240. The guide element 300 has a hollow cylindrical configuration for receiving the track adjust cylinder 230.

Multiple tabs 302 are provided on an outer surface 304 of the guide element 300. The tabs 302 may be sheet metal pieces which are attached to the guide element 300 through mechanical joining means such as welding, brazing, etc. Any other means may also be used to attach the tabs 302 to the guide element 300. The tabs 302 fit into corresponding openings 306 provided on the bulkhead 240. The guide element 300 is attached to the bulkhead 240 via a retainer plate 308. The retainer plate 308 may have any suitable shape to suit the need of the present disclosure. The retainer plate 308 may include holes to receive mechanical fasteners 310 such as nuts and bolts, to attach the retainer plate 308 to the bulkhead 240. Although other means of attachment may also be used to attach the retainer plate 308 to the bulkhead 240, mechanical fasteners 310 are preferred as mechanical fasteners 310 allow quick disassembly in case of a maintenance requirement. A cross-sectional plane A-A' extends across the guide element 300.

Figure 5:
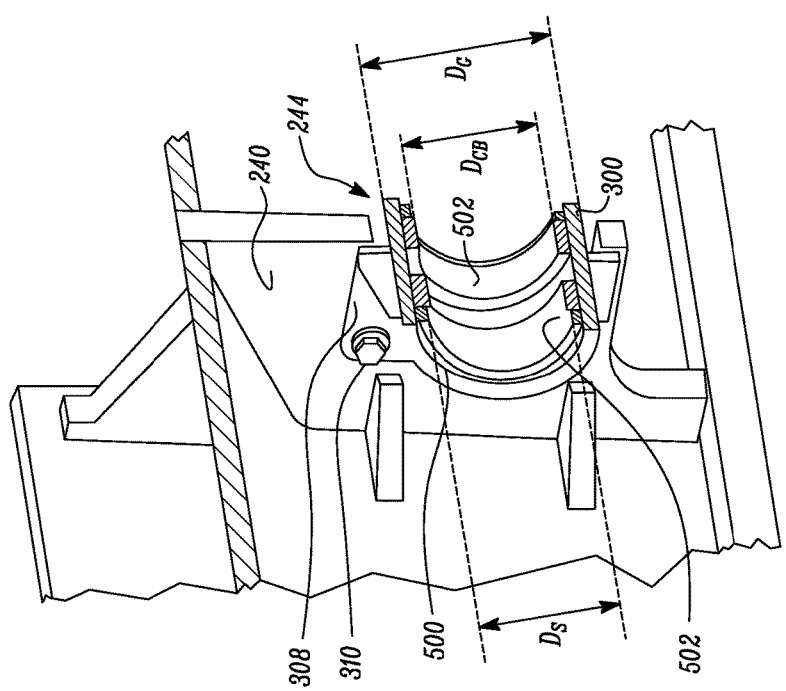
FIG. 5 is a cross-sectional view of the undercarriage assembly along a plane A-A' of FIG. 4.

FIG. 5 depicts a sectional view of the guide assembly 244 along with the bulkhead 240 taken along the plane A-A' shown in FIG. 4. As can be seen in FIG. 5, the guide assembly 244 further includes a seal member 500 axially aligned with the guide element 300 and having an inner diameter $D_S$ smaller than a diameter $D_G$ of the guide element 300. The seal member 500 seals the guide assembly 244 against dirt and other debris. The seal member 500 may either be a single member or multiple seal members placed at both ends of the guide element 300. The guide assembly 244 also includes a set of composite bearings 502 axially aligned with the seal member 500. The composite bearings 502 are made of materials such that the composite bearings 502 are self-lubricating. Any suitable type of composite bearings known in the art may be utilized.

The inner diameter $D_S$ of the seal member 500 is smaller than an inner diameter $D_{CB}$ of the composite bearings 502 when the track adjust cylinder 230 is not installed. After the track adjust cylinder 230 is installed in the guide element, the inner diameter $D_S$ of the seal member 500 and the inner diameter $D_{CB}$ of the composite bearings 502 are the same. The set of composite bearings 502 includes two bearings spaced apart from each other. The two bearings may be placed near the ends of the guide element 300. Such positioning of the set of composite bearings 502 near the ends of the guide element 300 may protect the guide assembly 244 from getting cantilevered and have less material cost. In one embodiment, the composite bearing 502 may be a single piece. The number and placement of the composite bearings 502 may vary without limiting the scope of the present disclosure.

INDUSTRIAL APPLICABILITY

The guide assembly 244 of the present disclosure is associated with the bulkhead 240 of the undercarriage system 110. In this system, in order to support the second end 228 of the yoke 220, the track adjust cylinder 230 is made out of a steel casting and the outer surface 238 of the track adjust cylinder 230 is machined according to that of a length that the swing link system will travel during operation. This machined outer surface 238 will ride inside of the composite bearing 502, as opposed to a typical greased/lubricated bearing. Hence, the guide assembly 244 will support the load and have a service life requiring no maintenance.

During operation, when the machine 100 is subject to a force that causes the track adjust cylinder 230 and/or the recoil spring 236 to move, the movement causes a corresponding movement of the yoke 220. As described earlier, the yoke 220 is attached to the track adjust cylinder 230 and the swing link 212. In between the track adjust cylinder 230, the yoke 220, and the swing link 212 are the pins 204 provided inside a joint thereof and the pivot joint 226, but allow rotation of the respective components. The idler 116 is fixed to the swing link 212 through the mechanical fasteners or the pins 204 that have no rotation in the corresponding joint. Further, the swing link 212 is connected to the guard which is set up the same way as the connection of track adjust cylinder 230, the yoke 220, and the swing link 212. As grease is pumped into the track adjust cylinder 230, the pressure of the grease pushes against the rod end 234 of the track adjust cylinder 230.

The guide assembly 244 slidably supports the track adjust cylinder 230. The composite bearings 502 are self-lubricating bearings which do not require any external lubrication means. The composite bearings 502 have a sealed structure and can be easily maintained. Also, the outer surface 238 of the track adjust cylinder 230 is machined to the extent of length that the track adjust cylinder 230 may travel, providing a smooth surface and reducing the friction between the track adjust cylinder 230 and the composite bearings 502. Thus, the bulkhead 240 and the guide assembly 244 supporting the track adjust cylinder 230 may not require frequent maintenance or replacement of the composite bearings 502. The guide assembly 244 provides a cost effective and easy to install recoil assembly 210.

There are several other connections in the undercarriage system 110 where the combination of the seal member 500 and the composite bearings 502 may be utilized in association with the undercarriage system 110. For example, the connections between the idler 116 with the swing link 212, the idler 116 with the guard 200 and connection of the swing assembly 212 with the first end 222 of the yoke 220 may also be provided with the combination of the seal member 500 and the composite bearings 502. In another example the connection of head end 232 of the track adjust cylinder 230 with the second end 228 of the yoke 220 may also be provided with the combination of the seal member 500 and the composite bearings 502.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A bulkhead assembly for a track adjust cylinder of an undercarriage system, the bulkhead assembly comprising:
   a bulkhead having an opening adapted to receive the track adjust cylinder;
   a guide element attached to the bulkhead, the guide element having a hollow cylindrical configuration, the guide element adapted to support the track adjust cylinder;
   a seal member axially aligned with respect to the guide element, the seal member having a diameter smaller than a diameter of the guide element; and
   a set of composite bearings axially aligned with respect to the seal member.

2. The bulkhead assembly of claim 1, wherein the set of composite bearings are two in number and are spaced apart from each other.

3. The bulkhead assembly of claim 1, wherein an outer surface of the track adjust cylinder is machined.

4. The bulkhead assembly of claim 1, wherein the guide element includes tabs adapted to fit into corresponding openings provided on the bulkhead.

5. The bulkhead assembly of claim 1 further comprising a retainer plate coupling the guide element to the bulkhead.

6. A recoil assembly for an undercarriage system, the undercarriage system including an idler, the recoil assembly comprising:
- a swing link having a first end and a second end, the first end coupled to the idler;
- a yoke having a first end and a second end, the first end coupled to the second end of the swing link ;
- a track adjust cylinder having a head end and a rod end, the head end coupled to the second end of the yoke;
- a bulkhead having an opening adapted to receive the track adjust cylinder;
- a guide assembly adapted to support the track adjust cylinder, the guide assembly including:
  - a guide element attached to the bulkhead, the guide element having a hollow cylindrical configuration;
  - a seal member axially aligned with respect to the guide element, the seal member having a diameter smaller than a diameter of the guide element; and
  - a set of composite bearings axially aligned with respect to the seal member; and
- a recoil spring attached to the rod end of the track adjust cylinder.

7. The recoil assembly of claim 6, wherein the set of composite bearings are two in number and are spaced apart from each other.

8. The recoil assembly of claim 6, wherein an outer surface of the track adjust cylinder is machined.

9. The recoil assembly of claim 6, wherein the swing link further comprises a third end such that the idler is pivotally coupled to a guard at the third end of the swing link.

10. The recoil assembly of claim 6, wherein the guide element includes tabs adapted to fit into corresponding openings provided on the bulkhead.

11. The recoil assembly of claim 6 further comprising a retainer plate coupling the guide element to the bulkhead.

12. A machine comprising:
- an undercarriage system including a track; and
- a recoil assembly for the undercarriage system, the recoil assembly comprising:
  - a swing link having a first end and a second end, the first end coupled to an idler of the undercarriage system;
  - a yoke having a first end and a second end, the first end coupled to the second end of the swing link ;
  - a track adjust cylinder having a head end and a rod end, the head end coupled to the second end of the yoke;
  - a bulkhead having an opening adapted to receive the track adjust cylinder;
  - a guide assembly adapted to support the track adjust cylinder, the guide assembly including:
    - a guide element attached to the bulkhead, the guide element having a hollow cylindrical configuration;
    - a seal member axially aligned with respect to the guide element, the seal member having a diameter smaller than a diameter of the guide element; and
    - a set of composite bearings axially aligned with respect to the seal member and
  - a recoil spring attached to the rod end of the track adjust cylinder.

13. The machine of claim 12, wherein the set of composite bearings are two in number and are spaced apart from each other.

14. The machine of claim 12, wherein the track adjust cylinder has a machined outer surface.

15. The machine of claim 12, wherein the guide element includes tabs adapted to fit into corresponding openings provided on the bulkhead.

16. The machine of claim 12 further comprising a retainer plate coupling the guide element to the bulkhead.

17. The machine of claim 12, wherein the swing link further comprises a third end such that the idler is pivotally coupled to a guard at the third end of the swing link.

\* \* \* \* \*